May 11, 1948.　　　　　C. GULBRANDSEN　　　　　2,441,267
POWER TRANSMISSION SHOCK ABSORBER
Filed May 3, 1945　　　　　3 Sheets-Sheet 1
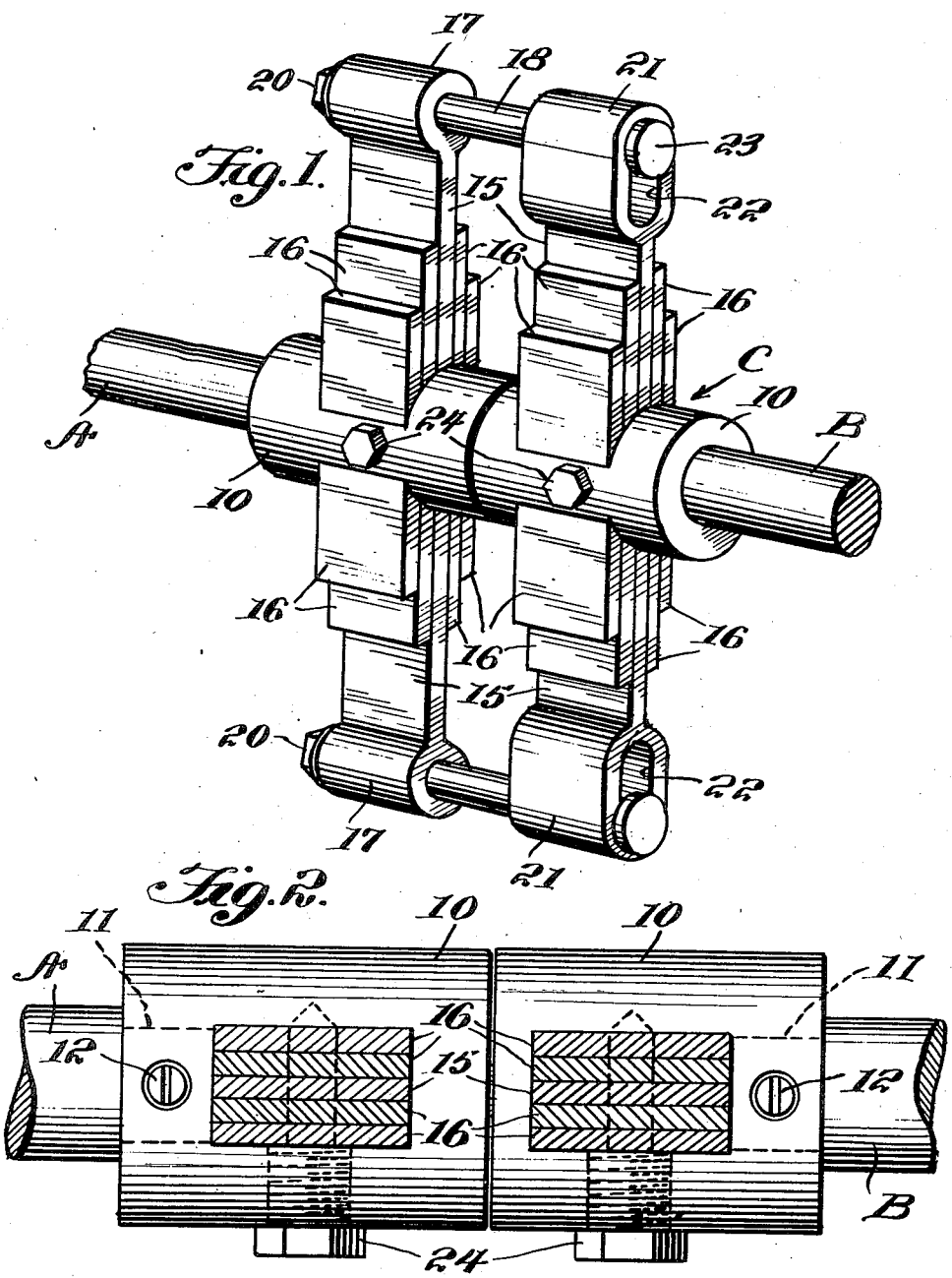
INVENTOR.
Carl Gulbrandsen,
BY Victor J. Evans & Co.
ATTORNEYS

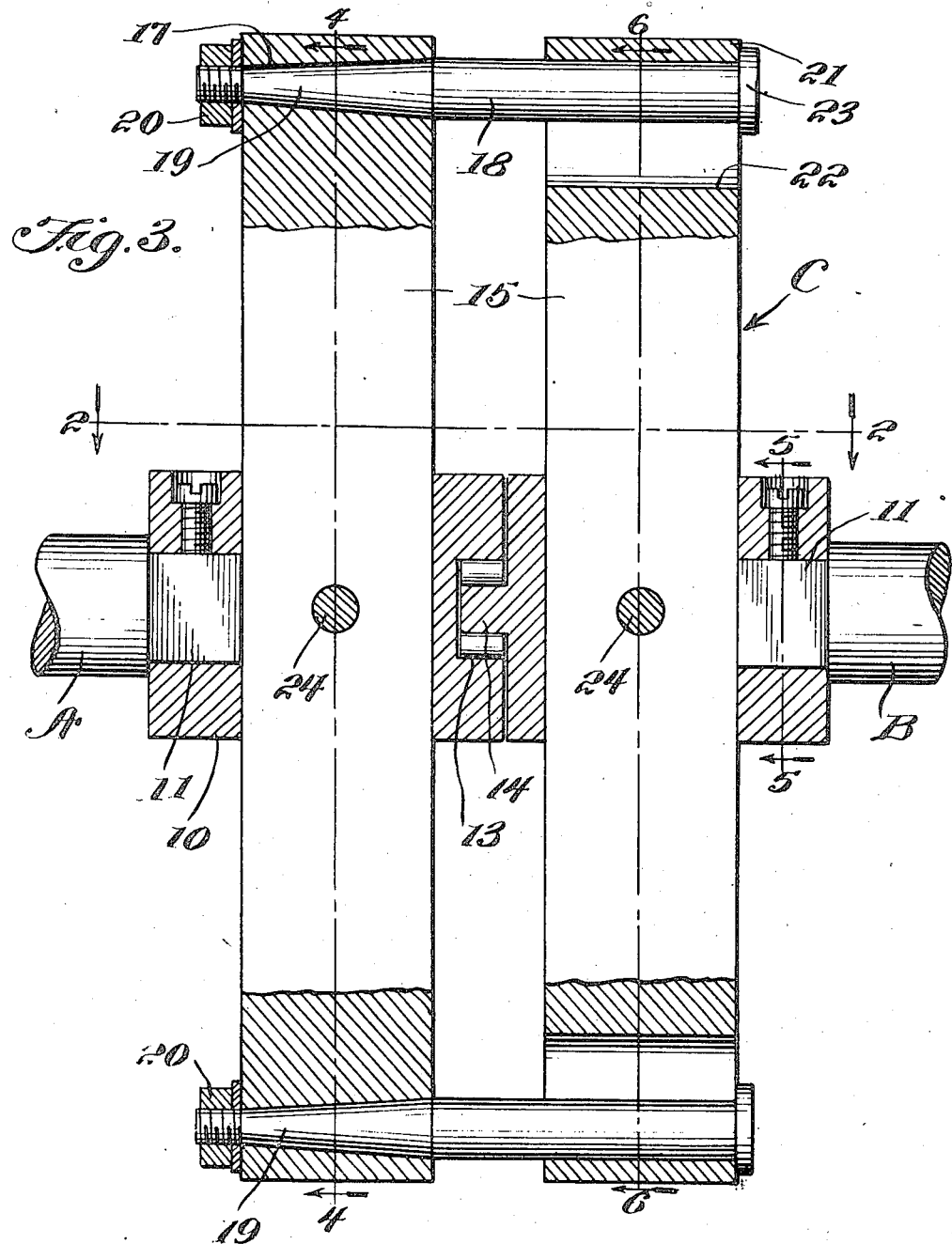

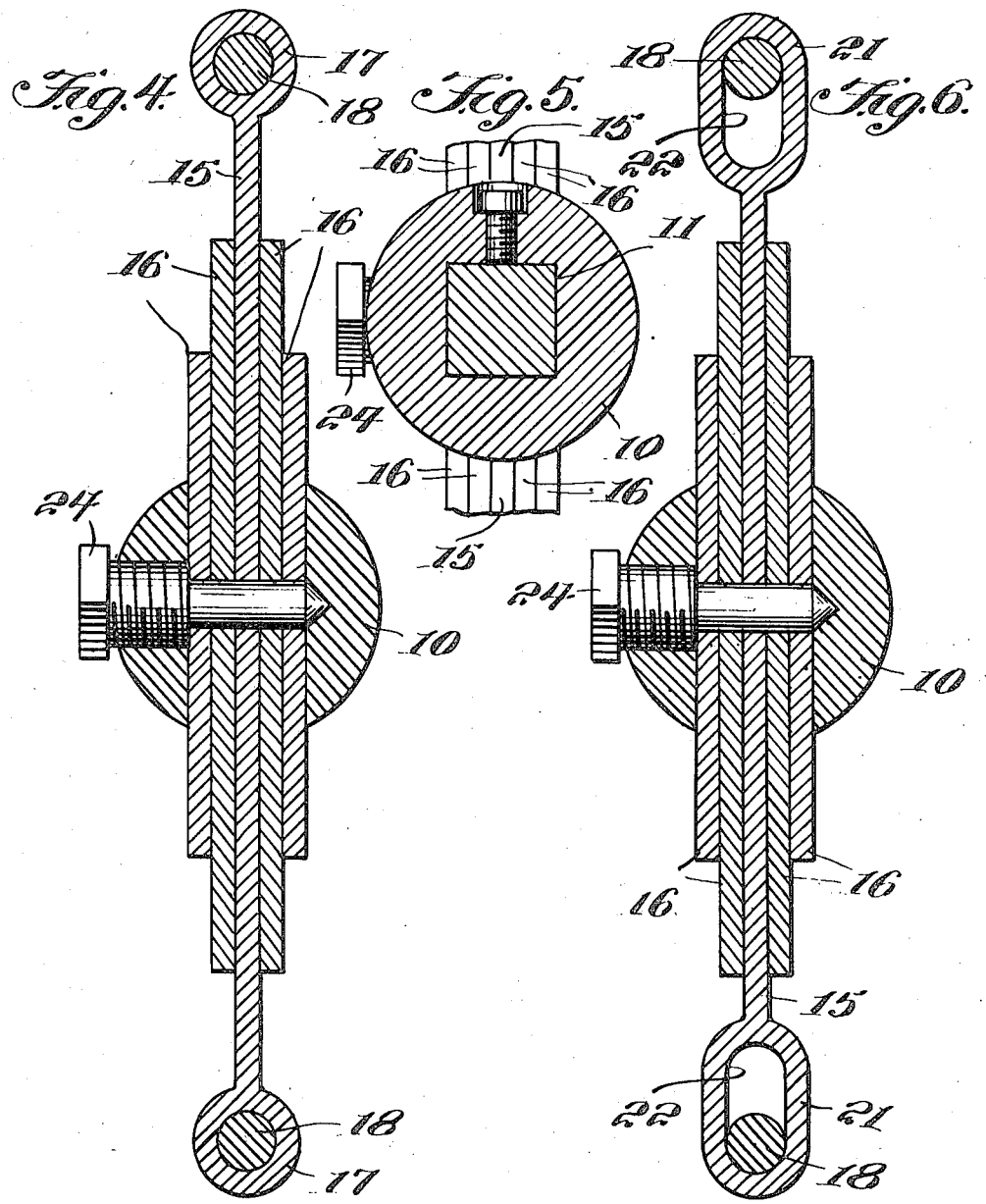

Patented May 11, 1948

2,441,267

UNITED STATES PATENT OFFICE 2,441,267

POWER TRANSMISSION SHOCK ABSORBER

Carl Gulbrandsen, Miami, Fla.

Application May 3, 1945, Serial No. 591,821

2 Claims. (Cl. 64—27)

The invention relates to a shock absorber, and more especially to a power transmission shock absorber assembly.

The primary object of the invention is the provision of an assembly of this character, wherein by the grouping into series of separated spring leaves and the coupling thereof in a divided power shaft sudden shocks and jars incident thereto in its travel will be absorbed to relieve undue strain thereon, and avoiding jerks in the motion transmitted thereby.

Another object of the invention is the provision of an assembly of this character, wherein it is novel in the makeup and unique under the assembly of its parts, so as to afford smooth motion to a power shaft, particularly when starting and stopping, thereby relieving shocks and jars resultant therefrom.

A further object of the invention is the provision of an assembly of this character, wherein the parts are susceptible of regulation to vary the resiliency and to assure absorption of shocks and jars incident to energy imparted thereto, and to reduce jerks and sudden strains in the operation of a power shaft.

A still further object of the invention is the provision of an assembly of this character, which is simple in construction, thoroughly reliable and efficient in operation, strong, durable, readily and easily installed, susceptible of use anywhere for coupling two shafts together for shock absorbing operation, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and hereinafter pointed out in the claims appended.

In the accompanying drawings:

Figure 1 is a fragmentary perspective view of a power shaft showing the assembly constructed in accordance with the invention applied.

Figure 2 is a cross sectional view thereof, taken approximately on the line 2—2 of Figure 3 looking in the direction of the arrows.

Figure 3 is an enlarged vertical longitudinal section view.

Figure 4 is a sectional view taken on the line 4—4 of Figure 3 looking in the direction of the arrows.

Figure 5 is a sectional view taken on the line 5—5 of Figure 3 looking in the direction of the arrows.

Figure 6 is a sectional view taken on the line 6—6 of Figure 3 looking in the direction of the arrows.

Similar reference characters indicate corresponding parts throughout the several views in the drawings.

Referring to the drawings in detail A and B, respectively, designate generally portions of separated sections of a power transmissions shaft for driving purposes, while C, denotes the assembly in its entirety, as constructed in accordance with the invention and hereinafter set forth.

The assembly C comprises a pair of companion hubs 10, each being socketed centrally thereof at 11, which is outermost thereof, for the accommodation of the section of the power shaft next thereto. A binding screw 12 is threaded in each hub 10 for the firm and secure fastening of the section of the shaft in the socket 11, although any other approved type of fastener may be installed for such purpose. The section A of the shaft is next to the power unit, not shown, while the section B of such shaft is remote to such unit, with the assembly C installed between these sections of said shaft.

The hubs 10 are aligned and centered with respect to each through the seating at 13 of a pilot projection or lug 14, the former being in the hub on the section A, while the latter is on the hub upon the section B of the power shaft.

Disposed crosswise in a suitable clearance centrally in each hub 10 with respect to its length is a group of spring leaves, including an intermediate long leaf 15 and graduated shorter outer leaves 16, respectively, which are arranged side-by-side in contacting relation, to each of the group and function as shock absorbing members thereof. The leaves 15 and 16 of each group extend outwardly from opposite sides of the hub 10 an equal distance, and the intermediate leaf 15 of one group has collar-like terminal heads 17 thereon, in which are fixed coupling pins 18, fastened therein at their wedging ends 19 by nuts 20 threaded thereon. The intermediate leaf 15 of the other group has elongated slotted terminal heads 21, its slots 22 loosely receiving the pins 18, which are held in this condition by enlargement 23, so that the groups of leaves 15 and 16 will be coupled together and the sections A and B of the power shaft resiliently joined with one another, so that shock absorbing activity will be had therebetween in the driving of such shaft for transmitting power energy to machinery.

The groups of spring leaves 15 and 16, each is held fast in the hub 10 companion thereto by a tiebolt 24 which penetrates the said leaves and hold the same fixed in the hub, the bolt 24 being tapped in such hub 10. The loose connection of the intermediate leaves 15 of the groups of leaves 15 and 16 by the pins 18 compensates for the flexing variation of such leaves 16 under shock absorbing action of the assembly C during the starting and stopping of the shaft.

It should be apparent that the longer the leaves 15 and 16 of the assembly are the more resiliency will be present therein, and in this manner the resiliency of such assembly is regulated, it being understood that the number of leaves can be increased or decreased in the groups at the option of the user of the said assembly.

It is believed that the construction and manner of operation of the assembly C will be clearly understood from the foregoing description when taken in connection with the accompanying drawings, so that a more extended explanation has been omitted for the sake of brevity. Changes, variations and modifications may be made in the invention as fall properly within the scope of the claims annexed hereto without departing from the spirit of the invention or sacrificing any of its advantages.

What is claimed is:

1. An assembly of the kind described, comprising a pair of companion hubs, each being socketed centrally at the outermost end thereof, a section of a sectional transmission shaft receivable in each socket, means in said hubs for retaining said sections in said sockets, means in said hubs for aligning and centering the hubs in relation to each other, a group of spring leaves disposed crosswise and centrally in each hub, said group including an elongated intermediate leaf and foreshortened outer leaves, terminal heads at the opposite ends of said intermediate leaf, coupling pins securing said intermediate leaves in aligned relation to each other at the ends thereof, and means in said hubs for holding said leaves fast therein.

2. The invention as in claim 1, wherein the terminal heads on one of the intermediate leaves have the pins taped therein, while the terminal heads on the other intermediate leaves are elongated to loosely receive the pins.

CARL GULBRANDSEN.

REFERENCES CITED

The following references are of record in the file of this patent:

UNITED STATES PATENTS

| Number | Name | Date |
|---|---|---|
| 1,438,273 | Spicer | Dec. 12, 1922 |
| 1,887,011 | Carr et al. | Nov. 8, 1932 |
| 1,965,024 | Allen | July 3, 1934 |
| 2,227,333 | Campbell | Dec. 31, 1940 |